US007964675B2

(12) United States Patent
Ko et al.

(10) Patent No.: US 7,964,675 B2
(45) Date of Patent: Jun. 21, 2011

(54) RECYCLED THERMOPLASTIC COMPOSITIONS

(75) Inventors: Allen Wai-Yee Ko, Rexford, NY (US); Michael L. Todt, Rexford, NY (US)

(73) Assignee: Sabic Innovative Plastics IP B.V. (NL)

( * ) Notice: Subject to any disclaimer, the term of this patent is extended or adjusted under 35 U.S.C. 154(b) by 569 days.

(21) Appl. No.: 11/032,648

(22) Filed: Jan. 10, 2005

(65) Prior Publication Data
US 2005/0228136 A1    Oct. 13, 2005

Related U.S. Application Data

(60) Provisional application No. 60/560,767, filed on Apr. 8, 2004.

(51) Int. Cl.
*C08L 71/12* (2006.01)
*B29B 17/00* (2006.01)

(52) U.S. Cl. ......... 525/390; 264/37.1; 264/911; 521/40; 525/391; 525/392; 525/394; 525/395; 525/397

(58) Field of Classification Search .................. None
See application file for complete search history.

(56) References Cited

U.S. PATENT DOCUMENTS

| | | | |
|---|---|---|---|
| 2,933,480 A | 4/1960 | Gresham | |
| 3,093,621 A | 6/1963 | Gladding | |
| 3,211,709 A | 10/1965 | Adamek et al. | |
| 3,646,168 A | 2/1972 | Barrett | |
| 3,790,519 A | 2/1974 | Wahlborg | |
| 3,884,993 A | 5/1975 | Gros | |
| 3,894,999 A | 7/1975 | Boozer et al. | |
| 4,059,654 A | 11/1977 | Von Bodungen et al. | |
| 4,166,055 A | 8/1979 | Lee, Jr. | |
| 4,433,088 A | 2/1984 | Haaf et al. | 524/153 |
| 4,584,334 A | 4/1986 | Lee, Jr. et al. | |
| 5,561,186 A * | 10/1996 | Nagaoka et al. | 524/538 |
| 5,772,041 A | 6/1998 | Kertscher et al. | |
| 5,894,996 A | 4/1999 | Williams | |
| 5,951,940 A | 9/1999 | Nosker et al. | |
| 6,274,637 B1 | 8/2001 | Schallenberg | |
| 6,426,474 B1 | 7/2002 | Maehata et al. | |
| 6,522,149 B2 | 2/2003 | Yokoyama et al. | |
| 6,588,597 B2 | 7/2003 | Arakane et al. | |

FOREIGN PATENT DOCUMENTS

| | | | |
|---|---|---|---|
| JP | 09-087511 | * | 3/1997 |
| JP | 2000-159900 | * | 6/2000 |
| WO | WO 92/22608 | | 12/1992 |
| WO | WO 03/087215 A1 | | 10/2003 |

OTHER PUBLICATIONS

Machine Translation of JP 2000-159900, provided by the JPO website (2000).*
Machine Translation of JP 09-087511, provided by the JPO website (1997).*
International Search Report; International Application PCT/US2005/011788; date mailed Jul. 1, 2005.
JP 2003-112156 Published on Apr. 15, 2003. Machine Translation. 32 pages.
ASTM D648-01 "Standard Test Method for Deflection Temperature of Plastics Under Flexural Load in the Edgewise Position". pp. 1-12.
ASTM D256-04 "Standard Test Methods for Determining the Izod Pendulum Impact Resistance of Plastics". pp. 1-20.
ASTM D790-03 "Standard Test Methods for Fleural Properties of Unreinforced and Reinforced Plasltics and Electrical Insulating Materials". pp. 1-11.
ASTM D1238-01 "Standard Test Method for Melt Flow Rates of Thermoplastic by Extrusion Plastometer". pp. 1-12.
Liang, et al. "The Effect of Risidual Impurities on the Rheological and Mechanical Properties of Engineering Polymers Separated from Mixed Plastics". SPE 59th ANTEC held on May 6-10, 2001. 5 pages.

* cited by examiner

*Primary Examiner* — Michael J Feely
(74) *Attorney, Agent, or Firm* — Cantor Colburn LLP

(57) ABSTRACT

A thermoplastic composition comprising recovered poly (arylene ether), less than or equal to 0.1 weight percent based on the total weight of the thermoplastic composition of a second recovered thermoplastic that gives off greater than or equal to 10 percent by mass of volatiles at a processing temperature for the thermoplastic composition; 0.025 to 4.0 weight percent, based on the total weight of the thermoplastic composition, of a third recovered thermoplastic selected from the group consisting of polyolefin, acrylonitrile-butadiene-styrene, polycarbonate, polycarbonate/acrylonitrile-butadiene-styrene blend, polymethyl methacrylate, polyamide, polyester, polycarbonate/polyester blend and combinations of two or more of the foregoing third recovered thermoplastics, wherein combinations of two or more of the foregoing third recovered thermoplastics are present in an amount of less than or equal to 10 weight percent, based on the total weight of the thermoplastic composition; and an optional virgin thermoplastic.

4 Claims, No Drawings

RECYCLED THERMOPLASTIC COMPOSITIONS

CROSS-REFERENCE TO RELATED APPLICATIONS

This application claims priority to U.S. Provisional Application Ser. No. 60/560,767 filed on Apr. 8, 2004, which is incorporated herein by reference.

BACKGROUND OF INVENTION

The disclosure relates to recycled thermoplastic compositions comprising recovered poly(arylene ether).

Thermoplastics are increasingly important as materials useful in the manufacture of a wide variety of items. It has long been acknowledged that the recycling of thermoplastics is highly desirable to decrease the waste stream and conserve precious natural resources. The recycling of thermoplastics has been a challenging endeavor due, in part, to the wide variety of thermoplastics in use and the difficulty in separating them. As a result recycled thermoplastics are frequently contaminated with other thermoplastics in levels such that the recycled thermoplastic is suitable for use in a narrower range of applications than virgin thermoplastic. This is further complicated by the fact that within a single type of thermoplastic there may be a wide range of grades and types with significant variability in physical properties. Additionally, the commingling of some thermoplastics, which would be compatible by themselves, is unsuccessful due to the presence of additives.

One approach to this problem has been to limit the recycle material to a small segment of available material in a way that allows only a very limited variability in the composition of the recycle stream. Another approach has been to provide commingled products that have limited performance profiles. These products would be limited to applications that have very low demands on the material. These approaches have significant limitations, either in feed streams that are available, or in outlets for low performance profile recycle blends.

Accordingly, there is a need for a thermoplastic composition comprising recycled thermoplastic that can be used in a wider range of applications.

BRIEF DESCRIPTION OF THE INVENTION

Disclosed herein is a recycled thermoplastic composition comprising recovered poly(arylene ether). In one embodiment, a thermoplastic composition comprises:
  a recovered poly(arylene ether);
  less than or equal to 0.1 weight percent, based on the total weight of the thermoplastic composition, of a second recovered thermoplastic that gives off greater than or equal to 10 percent by mass, based on the total weight of the second recovered thermoplastic, of volatiles at a processing temperature for the thermoplastic composition;
  0.025 to 4.0 weight percent, based on the total weight of the thermoplastic composition, of a third recovered thermoplastic selected from the group consisting of polyolefin, acrylonitrile-butadiene-styrene, polycarbonate, polycarbonate/acrylonitrile-butadiene-styrene blend, polymethyl methacrylate, polyamide, polyester, polycarbonate/polyester blend and combinations of two or more of the foregoing third recovered thermoplastics, wherein combinations of two or more of the foregoing third recovered thermoplastics are present in an amount of less than or equal to 10 weight percent, based on the total weight of the thermoplastic composition.

In another embodiment, a thermoplastic composition comprises:
  30 to 80 weight percent, based on the total weight of the thermoplastic composition, of a recovered poly(arylene ether);
  less than or equal to 0.1 weight percent, based on the total weight of the thermoplastic composition, of a second recovered thermoplastic that gives off greater than or equal to 10 percent by mass, based on the total weight of the second recovered thermoplastic, of volatiles at a processing temperature for the thermoplastic composition;
  0.025 to 4.0 weight percent, based on the total weight of the thermoplastic composition, of a third recovered thermoplastic selected from the group consisting of polyolefin, acrylonitrile-butadiene-styrene, polycarbonate, polycarbonate/acrylonitrile-butadiene-styrene blend, polymethyl methacrylate, polyamide, polyester, polycarbonate/polyester blend and combinations of two or more of the foregoing third recovered thermoplastics, wherein combinations of two or more of the foregoing third recovered thermoplastics are present in an amount of less than or equal to 10 weight percent, based on the total weight of the thermoplastic composition; and
  a virgin thermoplastic.

The above described and other features are exemplified by the following figure and the detailed description.

DETAILED DESCRIPTION

A thermoplastic composition comprises:
  a recovered poly(arylene ether)
  less than or equal to 0.1 weight percent, based on the total weight of the thermoplastic composition, of a second recovered thermoplastic that gives off greater than or equal to 10 percent by mass of volatiles at a processing temperature for the thermoplastic composition;
  0.025 to 4.0 weight percent, based on the total weight of the thermoplastic composition, of a third recovered thermoplastic selected from the group consisting of polyolefin, acrylonitrile-butadiene-styrene, polycarbonate, polycarbonate/acrylonitrile-butadiene-styrene blend, polymethyl methacrylate, polyamide, polyester, polycarbonate/polyester blend and combinations of two or more of the foregoing third recovered thermoplastics, wherein combinations of two or more of the foregoing third recovered thermoplastics are present in an amount of less than or equal to 10 weight percent, based on the total weight of the thermoplastic composition; and
  an optional virgin thermoplastic.

All ranges disclosed herein are inclusive and combinable (e.g., ranges of "up to 25 wt %, or, more specifically 5 wt % to 20 wt %" is inclusive of the endpoints and all intermediate values of the ranges of "5 wt % to 25 wt %," etc.). The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The recovered poly(arylene ether) is present in an amount greater than the amount of the second recovered thermoplastic and/or the third recovered thermoplastic. The recovered poly(arylene ether) may be present in an amount of 30 to 80 weight percent based on the total weight of the thermoplastic composition. Within this range, the recovered poly(arylene ether) may be present in an amount greater than or equal to 30 weight percent, or, more specifically, greater than or equal to 35 weight percent, or, even more specifically, greater than or equal to 40 weight percent based on the total weight of the thermoplastic composition. Also, within this range, the recovered poly(arylene ether) may be present in an amount less than or equal to 70 weight percent, or, more specifically, less than or equal to 65 weight percent, or, even more specifically, less than or equal to 60 weight percent based on the total weight of the thermoplastic composition.

The thermoplastic composition may comprise one or more virgin thermoplastics. Virgin thermoplastic, as used herein, excludes polymers and polymer blends that have been used in end-use parts. The virgin thermoplastic may be present in the thermoplastic composition in an amount of 10 to 95 weight percent, based on the total weight of the thermoplastic composition. Within this range, the virgin thermoplastic may be present in an amount greater than or equal to 20 weight percent, or, more specifically, greater than or equal to 40 weight percent, or, even more specifically, greater than or equal to 50 weight percent, based on the total weight of the thermoplastic composition. Also, within this range, the virgin thermoplastic may be present in an amount less than or equal to 90 weight percent, or, more specifically, less than or equal to 80 weight percent, based on the total weight of the thermoplastic composition. The virgin thermoplastic comprises a thermoplastic resin that is compatible with the recovered poly(arylene ether). Compatible, as used herein, is defined as being miscible with the recovered poly(arylene ether) or interacting with the recovered poly(arylene ether) so as to result in a thermoplastic composition with desired properties. In some embodiments, the compatibility between the recovered poly(arylene ether) and the virgin thermoplastic may be improved through the inclusion of glass fibers. In some cases the glass fibers can act as compatibilizers by permitting the blending of two normally incompatible thermoplastics. Suitable virgin thermoplastics include, but are not limited to, poly(arylene ether)s; poly (alkenyl aromatic) polymers such as polystyrene; polyolefins; acrylonitrile-butadiene-styrene graft copolymers; poly (alkenyl aromatic) block copolymers such as polystyrene-polybutadiene-polystyrene and polystyrene-poly(ethylene-butylene)-polystyrene; and combinations of two or more of the foregoing virgin thermoplastics.

The level of the one or more second recovered thermoplastics, while fairly broad in terms of thermoplastic recycling technology, surprisingly permits use of the composition in a wide range of applications while maintaining the desired physical properties. As explained below, some compositions, depending on their composition and their intended end use, may contain varying levels of the above-mentioned second recovered thermoplastic and/or additional thermoplastics or contaminants.

Thermoplastic compositions comprising poly(arylene ether), poly(alkenyl aromatic), polyolefin, acrylonitrile-butadiene-styrene graft copolymer, or combinations of the foregoing polymers have some striking similarities in the level of thermoplastic and metal contaminants that can be tolerated and still allow the composition to retain sufficient physical properties to be used in place of, or addition to, virgin polymer. While not wanting to be bound by theory, it is believed that similarities in processing temperature, decomposition temperature, end group reactivity, melt behavior and thermal degradative behavior are responsible for the similarities in the permissible level of contaminants.

The second recovered thermoplastics that give off greater than or equal to 10 percent by mass of volatiles at a processing temperature for the thermoplastic composition are extremely undesirable recovered thermoplastics for compositions comprising recovered poly(arylene) ether. Processing temperature is defined as greater than or equal to the softening temperature of the recovered poly(arylene ether).

The second recovered thermoplastics include, but are not limited to, polyvinyl chlorides, polyoxymethylenes, polyurethane, and combinations of two or more of the foregoing. These polymers or combinations of these polymers cannot be present in amounts greater than 0.1 weight percent based on the total weight of the composition, regardless of the identity of the recovered poly(arylene ether). In one embodiment, the second recovered thermoplastic is present in an amount less than or equal to 0.05 weight percent, based on the total weight of the thermoplastic composition. The second recovered thermoplastics are unstable and decompose at the processing temperature employed for poly(arylene ether)s. The decomposition products may have a negative impact on the extrusion or molding equipment, the surrounding environment and/or the thermoplastic composition.

The third recovered thermoplastics are generally immiscible with the recovered poly(arylene ether). The immiscibility can result, in elevated amounts, in large domains of the third recovered thermoplastic which can affect the mechanical properties and surface appearance of the composition. The mechanical properties that can be affected include glass transition temperature, melt flow, and processability, as well as combinations comprising at least one of the foregoing mechanical properties. In fact, in some instances, quantities of the third recovered thermoplastic can build up at some locations of the processing equipment (typically areas of turbulent or lower flow), coming off at intervals and having a negative impact on the consistency of the product.

It should be understood that the third recovered thermoplastic or thermoplastics may be independently present in amounts of 0.025 to 4.0 weight percent based on the total weight of the composition. Within this range, each of the third recovered thermoplastics may be present in an amount of 0.05 to 2 weight percent, or, more specifically 0.1 to 1.0 weight percent, based on the total weight of the thermoplastic composition. Combinations of third recovered thermoplastics may be present in amounts less than or equal to 10 weight percent, or, more specifically, less than or equal to 9 weight percent, or, even more specifically, less than or equal to 8 weight percent, based on the total weight of the thermoplastic composition.

The third recovered thermoplastics include, but are not limited to, polyolefins, polycarbonates, acrylonitrile-butadiene-styrene, polycarbonate/acrylonitrile-butadiene-styrene blends, polymethyl methacrylate, polyesters, polycarbonate/polyester blends, polyamides, and combinations of two or more of the foregoing.

Thermoplastic compositions comprising poly(arylene ether) as a recovered thermoplastic find use in poly(arylene ether) based compositions, particularly in poly(arylene ether)/poly(alkenyl aromatic) polymer blends. Recovered poly(arylene ether), as used herein, is intended to include poly(arylene ether)/polystyrene blends, compatibilized poly (arylene ether)/polyamide blends, compatibilized and non-compatibilized poly(arylene ether)/polyolefin blends, and combinations of two or more of the foregoing.

The thermoplastic composition may further comprise less than or equal to 10 parts per million, based on the total weight of the thermoplastic composition, of a metal selected from the group consisting of iron, copper, sodium, potassium, calcium, lithium, magnesium, and combinations of two or more of the foregoing. In one embodiment, the thermoplastic composition further comprises less than or equal to 5 parts per million, based on the total weight of the thermoplastic composition, of a metal selected from the group consisting of cadmium, mercury, lead, and combinations of two or more of the foregoing metals. The term "metal" includes both ionic and non-ionic metal species.

The recovered poly(arylene ether) is recovered from end of life parts, manufacturing scrap, and the like, as well as combinations comprising at least one of the foregoing. Articles having reached the end of their useful life and/or manufacturing scrap are gathered in a collection center. The parts are disassembled, manually and/or by crushing, and valuable metals may be recovered. The remaining non-metallic portion is predominately plastic and is further processed to remove residual metals, paper, foam materials and such. The collection center may presort the plastics using a variety of criteria such as part identity, geography, age of the end of life part, and the like, as well as combinations comprising at least one of the foregoing criteria. The collection center may rely on separation techniques described below or use a combination of presorting and separation techniques to separate different types of thermoplastic.

Each type of thermoplastic has a unique set of physical characteristics such as specific gravity and electrostatic properties which may provide the basis for thermoplastic separation. A typical recovery process may comprise air separation, magnetic separation, eddy current separation, color sorting, specific gravity separation, electrostatic separation or a combination of two or more of the preceding methods. In many recovery processes the non-metallic portion is crushed into particulate of fairly uniform size. Exemplary recovery processes are described in U.S. Pat. Nos. 5,772,041, 5,894,996, 6,522,149, 6,426,474, 5,951,940, and 6,588,597. Higher purity materials may be achieved through the repetition of some or all of the separation steps. A greater number of steps typically corresponds to higher process and higher material cost.

The recovered poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and the like, as well as combinations comprising at least one of the foregoing. Poly(arylene ether)s are known polymers comprising a plurality of structural units of the formula (I):

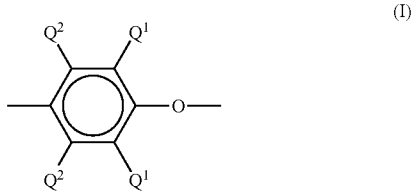

wherein for each structural unit, each $Q^1$ and $Q^2$ is independently hydrogen, halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen.

Both homopolymer and copolymer poly(arylene ether) are included. The preferred homopolymers are those comprising 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether)s containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s further include combinations comprising at least one of the above.

The poly(arylene ether) can have a number average molecular weight of 3,000 to 40,000 grams per mole (g/mol) and/or a weight average molecular weight of 5,000 to 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) can have an intrinsic viscosity of 0.10 to 0.60 deciliters per gram (dl/g), or, more specifically, 0.29 to 0.48 dl/g, as measured in chloroform at 25° C. It is possible to utilize a combination of high intrinsic viscosity poly(arylene ether) and a low intrinsic viscosity poly(arylene ether). Determining an exact ratio, when two intrinsic viscosities are used, will depend somewhat on the exact intrinsic viscosities of the poly(arylene ether) used and the ultimate physical properties that are desired.

The poly(arylene ether) may be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

Polyolefins are of the general structure: $C_nH_{2n}$ and include polyethylene, polypropylene and polyisobutylene with preferred homopolymers being polyethylene, LLDPE (linear low density polyethylene), HDPE (high density polyethylene) and MDPE (medium density polyethylene) and isotatic polypropylene. Polyolefin resins of this general structure and methods for their preparation are well known in the art and are described for example in U.S. Pat. Nos. 2,933,480, 3,093,621, 3,211,709, 3,646,168, 3,790,519, 3,884,993, 3,894,999, 4,059,654, 4,166,055 and 4,584,334.

Acrylonitrile-butadiene-styrene (ABS) graft copolymers contain two or more polymeric parts of different compositions, which are bonded chemically. The graft copolymer preferably has a polymeric backbone comprising alkenyl aromatic repeating units and units resulting from the polymerization of a conjugated diene such as butadiene or another conjugated diene. The polymeric backbone has at least one grafted monomer, and preferably two, which are polymerized in the presence of the polymer backbone to obtain the graft copolymer.

The polymeric backbone is preferably a conjugated diene polymer such as polybutadiene, polyisoprene, or a copolymer, such as butadiene-styrene, butadiene-acrylonitrile, or the like.

The conjugated diene monomers normally utilized in preparing the polymeric backbone of the graft copolymer are described by the following formula

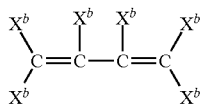

(XIII)

wherein $X^b$ is hydrogen, $C_1$-$C_5$ alkyl, chlorine, bromine, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures comprising at least one of the foregoing conjugated diene monomers, and the like. A preferred conjugated diene monomer is butadiene.

One monomer or group of monomers that may be polymerized in the presence of the polymeric backbone are monovinylaromatic hydrocarbons. The monovinylaromatic monomers utilized are described by the following formula (XIV):

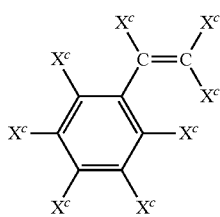

(XIV)

wherein $X^c$ is hydrogen, $C_1$-$C_{12}$ alkyl (including cycloalkyl), $C_6$-$C_{12}$ aryl, $C_7$-$C_{12}$ aralkyl, $C_7$-$C_{12}$ alkaryl, $C_1$-$C_{1-2}$ alkoxy, $C_6$-$C_{12}$ aryloxy, chlorine, bromine, or the like. Examples of the monovinylaromatic monomers include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, mixtures comprising at least one of the foregoing compounds, and the like. The preferred monovinylaromatic monomers are styrene and/or alpha-methylstyrene.

A second group of monomers that may be polymerized in the presence of the polymeric backbone are acrylic monomers such as acrylonitrile, substituted acrylonitrile and/or acrylic acid esters, exemplified by acrylonitrile, and $C_1$-$C_7$ alkyl acrylates, such as methyl methacrylate, and the like.

The acrylonitrile, substituted acrylonitrile, or acrylic acid esters are described by the following formula (XV):

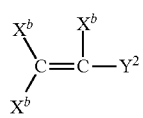

(XV)

wherein $X^b$ is as previously defined and $Y^2$ is cyano, $C_1$-$C_{12}$ alkoxycarbonyl, or the like. Examples of such monomers include acrylonitrile, ethacrylonitrile, methacrylonitrile, alpha-chloroacrylonitrile, beta-chloroacrylonitrile, alpha-bromoacrylonitrile, beta-bromoacrylonitrile, methyl acrylate, methyl methacrylate, ethyl acrylate, butyl acrylate, propyl acrylate, isopropyl acrylate, mixtures comprising at least one of the foregoing monomers, and the like. Preferred monomers include acrylonitrile, ethyl acrylate, and methyl methacrylate.

Optionally, the polymeric backbone may be an acrylate rubber, such as the polymerization product of n-butyl acrylate, ethyl acrylate, 2-ethylhexyl acrylate, mixtures comprising at least one of the foregoing, and the like. Additionally, minor amounts of a diene may be copolymerized in the acrylate rubber backbone to yield improved grafting with the matrix polymer.

Polyvinyl chloride, polymethyl methacrylate (also known as methacrylic resins), polyamide, polycarbonate, polyester such as polybutylene terephthalate (PBT) or polyethylene terephthalate (PET), polyurethane, polycarbonate/ABS blends, and polycarbonate/polyester are well known polymers whose identity is clearly understood by one of ordinary skill in the art.

The compositions are further illustrated by the following non-limiting examples.

EXAMPLES

A commercially available blend of poly(2,6-dimethylphenylene ether), high impact polystyrene, and flame retardant (NORYL N190X available from GE Advanced Materials) was melt blended with an additional component as shown in Tables 2 and 3. Table 1 lists the additional components employed in the examples. Polyvinyl chloride, polyoxymethylene and polyurethane were present in an amount of 0.5 weight percent based on the total weight of N190X. Polypropylene, acrylonitrile-butadiene-styrene graft copolymer, polycarbonate/acrylonitrile-butadiene-styrene graft copolymer blend, polybutylene terephthalate, polycarbonate/polybutylene terephthalate blend, polymethyl methacrylate and polyamide were present in an amount of 5 weight percent based on the total weight of N190X.

After melt blending the compositions were injection molded into test samples, when appropriate, and tested for modulus, yield stress, yield strain, break stress and break strain according to ASTM 790, impact strength (notched izod or NII) according to ASTM D256, heat distortion temperature (HDT) according to ASTM D648 at 1.8 Megapascals (Mpa), and melt viscosity rate (MVR) according to ASTM D 1238 at 280° C. and a 5 kilogram load. Test values of the examples were compared to an average of 3 test values for the same test performed on NORYL N190X and the absolute difference is reported in Table 2.

TABLE 1

| Component | Description/Supplier |
|---|---|
| PVC | Polyvinyl chloride commercially available from Formosa Plastic under the tradename Formolon. |
| POM | Polyoxymethylene commercially available from Ticona under the tradename Celcon. |
| PU | Polyurethane commercially available from BASF under the tradename Elastollan. |
| PP | Polypropylene commercially available from BP as the grade 1046. |
| ABS | Acrylonitrile-butadiene-styrene graft copolymer commercially available from GE Advanced Materials under the tradename CYCOLAC. |
| PC/ABS | A polycarbonate/acrylonitrile-butadiene-styrene graft copolymer blend commercially available from GE Advanced Materials under the tradename CYCOLOY 6600. |
| PBT | Polybutylene terephthalate commercially available from GE Advanced Materials under the tradename VALOX. |

TABLE 1-continued

| Component | Description/Supplier |
|---|---|
| PC/PBT | A polycarbonate/polybutylene terephthalate blend commercially available from GE Advanced Materials under the tradename XENOY. |
| PMMA | Polymethylmethacrylate commercially available from Degussa under the tradename Plexiglas. |
| PA | Polyamide commercially available from Rhodia under the tradename Technyl. |
| LiCl | Lithium chloride |
| $Fe_2O_3$ | Iron trioxide |
| $CaCO_3$ | Calcium carbonate |
| Fe | Iron |
| CuO | Copper oxide |
| CuCl | Copper chloride |
| $Cu_2SO_4$ | Copper sulfate |
| Cu | Copper |
| NaCl | Sodium chloride |
| $Na_2SO_4$ | Sodium sulfate |
| KCl | Potassium chloride |
| $K_2CO_3$ | Potassium carbonate |
| $CaCl_2$ | Calcium chloride |
| MgO | Magnesium oxide |

TABLE 2

|  | PVC | POM | PU | PP | ABS | PC/ABS | PMMA | PA | PBT | PC/PBT |
|---|---|---|---|---|---|---|---|---|---|---|
| Modulus | 3.80 | 3.85 | 9.74 | 6.34 | 1.18 | 6.58 | 0.24 | 10.46 | 8.19 | 10.97 |
| Yield Stress | 1.42 | 1.46 | −0.68 | 1.49 | 1.15 | 1.07 | 0.65 | 2.90 | 2.18 | 1.50 |
| Yield Strain | 1.54 | 3.13 | 2.04 | 3.53 | 1.00 | 4.76 | 1.87 | 1.21 | 6.93 | 7.51 |
| Break Stress | 8.25 | 0.97 | 3.52 | 6.14 | 5.85 | 5.21 | 4.25 | 0.49 | 5.90 | 5.21 |
| Break Strain | 23.71 | 12.83 | 15.35 | 26.55 | 4.99 | 17.18 | 8.96 | 4.26 | 1.08 | 19.48 |
| NII | 21.15 | 36.72 | 10.62 | 25.31 | 8.66 | 7.12 | 21.65 | 41.80 | 10.62 | 19.07 |
| HDT | 2.25 | 0.00 | 0.36 | 0.43 | 4.98 | 1.15 | 3.16 | 0.97 | 4.61 | 3.22 |
| MVR | 36.35 | 7.61 | 26.29 | 14.17 | 9.25 | 13.23 | 9.17 | 10.07 | 2.24 | 19.33 |

TABLE 3

|  | LiCl | $Fe_2O_3$ | $CaCO_3$ | Fe | CuO | CuCl | $Cu_2SO_4$ |
|---|---|---|---|---|---|---|---|
| Weight of metal compound in thermoplastic composition, ppm | 1,000 | 6,000 | 17,000 | 2,000 | 40 | 50 | 120 |
| Modulus | 8.81 | 13.15 | 15.05 | 12.06 | 2.43 | 14.07 | 11.51 |
| Yield Stress | 0.72 | 1.84 | 1.44 | 0.01 | 1.23 | 1.09 | 1.79 |
| Yield Strain | 5.33 | 7.03 | 8.86 | 8.91 | 0.52 | 6.13 | 4.91 |
| Break Stress | 5.04 | 0.73 | 2.75 | 2.05 | 8.66 | 4.10 | 6.41 |
| Break Strain | 10.74 | 14.35 | 27.80 | 20.56 | 28.78 | 15.29 | 40.20 |
| NII | 17.90 | 7.58 | 37.97 | 2.22 | 3.00 | 11.32 | 2.66 |
| HDT | 0.55 | 0.97 | 0.61 | 1.52 | 0.12 | 0.36 | 0.85 |
| MVR | 29.05 | 17.18 | 8.02 | 4.93 | 1.79 | 10.75 | 9.97 |

|  | Cu | NaCl | $Na_2CO_3$ | KCl | $K_2CO_3$ | $CaCl_2$ | MgO |
|---|---|---|---|---|---|---|---|
| Weight of metal compound in thermoplastic composition, ppm | 30 | 800 | 1,450 | 450 | 840 | 18,500 | 1,200 |
| Modulus | 13.57 | 12.21 | 9.64 | 0.48 | 2.27 | — | 0.57 |
| Yield Stress | 0.83 | 1.08 | 0.24 | 1.52 | 1.94 | — | 2.40 |
| Yield Strain | 8.09 | 6.16 | 7.23 | 4.59 | 4.64 | — | 0.54 |
| Break Stress | 7.43 | 4.62 | 1.60 | 6.13 | 7.97 | — | 9.18 |
| Break Strain | 58.47 | 11.41 | 14.42 | 1.52 | 25.33 | — | 25.27 |
| NII | 6.16 | 1.58 | 2.58 | 6.34 | 1.58 | — | 5.19 |
| HDT | 2.00 | 0.18 | 2.37 | 2.13 | 3.28 | — | 0.18 |
| MVR | 11.14 | 10.88 | 7.52 | 4.88 | 13.98 | 39.90 | 7.69 |

As can be seen from the foregoing examples compositions containing 0.5 weight percent polyvinyl chloride, polyoxymethylene, or polyurethane had physical properties that varied by more than 20% from the base resin. A twenty percent variance in physical properties would be sufficient to make a composition unsuitable for use in many applications where the base resin is employed.

The foregoing examples demonstrate the effects of the inclusion of 4-5 weight percent of a third thermoplastic such as polypropylene, acrylonitrile-butadiene-styrene copolymer, polycarbonate, polycarbonate/acrylonitrile-butadiene-styrene copolymer blend, polymethyl methacrylate, polyamide, polybutylene terephthalate, and polycarbonate/polybutylene terephthalate blends. In each case either a single physical property or a combination of 2 physical properties exhibits a change of 15 percent or greater compared to the base resin. A change of 20 percent or more in a physical property can make a material unsuitable for many applications. In some embodiments a combined change of 15% in two physical properties can have a negative impact on the suitability of a composition for some applications.

Additionally, the foregoing examples also demonstrate the effects of the inclusion of metals and metal compounds. The inclusion of even small amounts of metal compounds can have a significant effect on the physical properties of the composition. Each of the examples show a combined change of 15% in two physical properties and/or a change of 20 percent or more in a single physical property. As mentioned before this magnitude of change can make a material unsuitable for many applications.

The presence of the afore described polymers, either singly or in combination, in recycled thermoplastic compositions comprising poly(arylene ether) can affect the physical properties of the recycled thermoplastic composition thus leading to the prevailing belief in the thermoplastic recycling industry that recycled thermoplastics must be highly pure in order to be useful in applications normally employing virgin resin. Contrary to that belief recycled thermoplastics can contain fairly high levels of secondary thermoplastics and still retain a physical property profile substantially similar to virgin material.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A thermoplastic composition, consisting of:
a recovered poly(arylene ether);
less than or equal to 0.1 weight percent based on the total weight of the thermoplastic composition of a second recovered thermoplastic that gives off greater than or equal to 10 percent by mass of volatiles at a processing temperature for the thermoplastic composition; and
a third recovered thermoplastic selected from the group consisting of polyolefin, acrylonitrile-butadiene-styrene, polycarbonate, polycarbonate/acrylonitrile-butadiene-styrene blend, polymethyl methacrylate, polyester, polycarbonate/polyester blend and combinations thereof, wherein each of the individual foregoing third recovered thermoplastics is present in an amount of 0.025 to 4.0 weight percent, based on the total weight of the thermoplastic composition, and wherein combinations of two or more of the individual foregoing third recovered thermoplastics are present in an amount less than or equal to 10 weight percent, based on the total weight of the thermoplastic composition;
wherein the recovered materials are recovered from end of useful life parts, manufacturing scrap and combinations thereof.

2. The thermoplastic composition of claim 1, wherein the second recovered thermoplastic is present in an amount of less than or equal to 0.05 weight percent, based on the total weight of the thermoplastic composition.

3. The thermoplastic composition of claim 1, wherein the second recovered thermoplastic is selected from the group consisting of polyvinyl chloride, polyoxymethylene, polyurethane and combinations of two or more of the foregoing.

4. The thermoplastic composition of claim 1, wherein the third recovered thermoplastic is present in an amount of 0.1 to 1 weight percent, based on the total weight of the thermoplastic composition.

* * * * *